United States Patent [19]

Henter

[11] Patent Number: 5,827,066

[45] Date of Patent: Oct. 27, 1998

[54] METHODS OF TEACHING MATHEMATICS TO DISABLED STUDENTS

[76] Inventor: Ted Henter, Henter-Joyce, Inc., 2100 62nd Ave. North, St. Petersburg, Fla. 33702

[21] Appl. No.: 789,403

[22] Filed: Jan. 29, 1997

Related U.S. Application Data

[63] Continuation of Ser. No. 401,976, Mar. 10, 1995, abandoned.

[51] Int. Cl.[6] .............................. G09B 19/02; G09B 5/00; G09B 1/00
[52] U.S. Cl. ......................... 434/188; 434/191; 434/201; 434/209
[58] Field of Search .................................. 434/188, 209, 434/210, 212, 191, 201

[56] References Cited

U.S. PATENT DOCUMENTS

| | | | |
|---|---|---|---|
| 4,117,607 | 10/1978 | Gill | 434/201 |
| 4,946,391 | 8/1990 | Hawkins et al. | 434/201 |
| 5,135,398 | 8/1992 | Thornton et al. | 434/201 |
| 5,387,104 | 2/1995 | Corder | 434/118 |

FOREIGN PATENT DOCUMENTS 2127200   4/1984   United Kingdom .................. 434/191

*Primary Examiner*—Robert A. Hafer
*Assistant Examiner*—John Edmund Rovnak
*Attorney, Agent, or Firm*—Arent Fox Kintner Plotkin & Kahn, PLLC

[57] ABSTRACT

The method for teaching mathematics to students with disabilities includes an interactive program with a synthesized speech output and voice input, the interactive program being designed with different predetermined modules for different skills (i.e., addition, subtraction, multiplication and division) and for different levels (i.e., beginner, intermediate, expert) and for different modes of learning (i.e., tutorial, testing), the interactive program describing the mechanical process for setting up the problem as if the user had no disabilities and breaking down the problem into smaller and easier problems and querying the user as to the answer to those smaller problems.

8 Claims, 3 Drawing Sheets

METHODS OF TEACHING MATHEMATICS TO DISABLED STUDENTS

This is a continuation of application Ser. No. 08/401,976, filed Mar. 10, 1995 now abandoned.

BACKGROUND OF THE INVENTION

The present invention relates to a method for teaching mathematics to students with disabilities.

The ability to solve simple arithmetic problems is essential for the average individual in our society. For example, knowledge of basic addition and subtraction is essential for an individual to engage in conventional commerce and to live and work independently. It is essential for an individual to know if he/she is receiving correct change at the local grocery store or to be able to balance his/her checkbook. Individuals with certain disabilities such as blindness, however, have an extremely difficult time learning and retaining the basic mechanics of arithmetic.

Consider, for example, the process of adding two multi-digit numbers together. First, one multi-digit number is written on the page. Then, the second multi-digit number is written directly over (or under) the other multi-digit number, so that the column for the "ones" place (the most right column in a whole number) is aligned, the column for the "tens" place is aligned, etc:

|   | tens | ones |       |
|---|------|------|-------|
|   | 1    | 5    |       |
|   | + 2  | 6    | total |

Then, the numbers in the "ones" column are added together and the sum written under the total line drawn beneath that column, the "tens" column is then added, etc., until eventually a total is reached. If the total of any one column is greater than 9, the tens digit is carried over to the next column to be added with the numbers in that column.

|           | tens | ones |       |
|-----------|------|------|-------|
| carryover | 1    |      |       |
|           | 1    | 5    |       |
|           | + 2  | 6    | total |
|           | 4    | 1    |       |

Many disabled people, however, cannot master the fundamentals of this mechanical process. If a blind person tries to perform this addition problem in braille, one problem encountered is that writing the "carry-over" from the previous column above the column to the left is very difficult, if not impossible. A blind person loses the advantage of containing the information in a logical format, a format that guides the problem-solver step-by-step through the problem and minimizes the amount of memorization required and which utilizes the immediately preceding answers to contribute to the end result.

A person who is blind has the inconvenience of the medium to deal with since they cannot read printed material. A person who has other types of physical disabilities may not be able to create the symbols required or may have difficulty keeping the columns straight or putting the carry-over number above the correct column.

There are still further difficulties associated with attempting more complex mathematical problems such as division, multiplication, calculus, etc. A person with severe physical disabilities may find it almost impossible to learn these forms of higher math.

Blind individuals have been taught to use an abacus to learn the concepts of math, and demonstrate to an instructor that the process has been learned. The abacus contains tangible information that can be manipulated and retrieved. However it does not create a permanent record, such as on a piece of paper. Moreover, the results of a mathematical problem using an abacus do not lend themselves to review or correction. The steps taken are transient, they cannot be retraced or followed after they are completed. It is a technique that is out of the mainstream, and not readily understood.

Braille has been used for decades to read literature and other static, nonchanging information. It is relatively easy to read or retrieve, but it is very difficult to create or manipulate. One can change a braille character, but you cannot add or remove braille characters. Furthermore, there is not enough room between the characters or lines of characters to insert a temporary number.

Braille requires a mechanical apparatus to create the dots, but when the paper is placed in this apparatus, the information it contains cannot be read. Thus, the data must be read, then placed in the braille writer and updated, then removed and read, then placed back in to add more, etc. This is very clumsy, time consuming, and distracting. It does create a permanent record, but it is also very odd and not easily understood by the typical instructor.

Electronic or mechanical calculators have been and are being used by blind and learning disabled people, especially those that verbalize their output. The disadvantage of using a calculator is that it does all the work for the student, it does not force the student to learn or understand the process. It does not create a record of the steps taken to show the instructor that the student understands the process.

Additional prior systems developed for instructional use for persons with disabilities have included the use of special keyboards or a mouse having tactile feedback in conjunction with computers for blind users, for example. Such systems, however, have never addressed the difficulties of teaching mathematics as opposed to other subjects to persons with disabilities.

There is therefore a significant need for a method of effectively and efficiently instructing persons with disabilities in the field of mathematics for addition, subtraction, multiplication and division skills at a minimum. There is also a need for a method of instruction which will enable cognitive retention of mathematical skills and processes over time.

SUMMARY OF THE INVENTION

It is therefore an object of the present invention to provide an effective and efficient method of instruction of mathematics for individuals with disabilities such as blindness, or who lack the physical mobility required to use a standard paper and pencil method of learning mathematics, or those with learning disabilities that inhibit complex, cognitive functions.

It is a further object of the present invention that such a method of instruction be effective in providing cognitive retention of mathematical skills over time.

It is an additional object of the present invention to utilize a synthesized speech output computer system to assist in the teaching method.

It is a still further object of the present invention to provide a method of teaching that will replicate the mechanics of mathematics functions found in normal human cognition.

To achieve the objects and in accordance with the purpose of the invention, as embodied and broadly described herein, a method of teaching mathematics to a student with a disability is provided, comprising the steps of: using an interactive process to output a plurality of queries to the student, said pluralities of queries being output one at a time; selecting a predetermined one of two different modes of teaching of said interactive process, a first predetermined mode of teaching being the tutorial mode for initial learning of a concept by the student, a second predetermined mode of teaching being the testing mode for testing whether the student comprehended the concept in said first mode; selecting a predetermined one of three skill levels of said plurality of queries, a first skill level being a beginner level, a second skill level being an intermediate level and a third skill level being an expert level; selecting a predetermined one of a plurality of problem area modules for instruction, said problem area modules comprising a plurality of problems for solution in the basic mathematical skills including addition, subtraction, multiplication and division; outputting an initial query to the student for response, said initial query being a subpart of a first mathematical problem in said predetermined, selected one of said plurality of problem areas; responding to said initial query by inputting an answer to said subpart of said first mathematical problem; indicating whether said input answer was correct or incorrect and outputting a second query representing a second subpart of said first mathematical problem if said input answer was correct or a reiteration of said first subpart of said first mathematical problem if said input answer was incorrect to the student for response; repeating said responding, indicating and outputting steps until the student solves the first mathematical problem; and outputting a second-level query to the student for response, said second-level query being a subpart of a second mathematical problem in said predetermined, selected one of said plurality of problem areas; and repeating said outputting, responding, indicating and outputting, repeating, and outputting steps until all of said plurality of problems for solution in said selected problem area module have been solved.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Figure 1A:
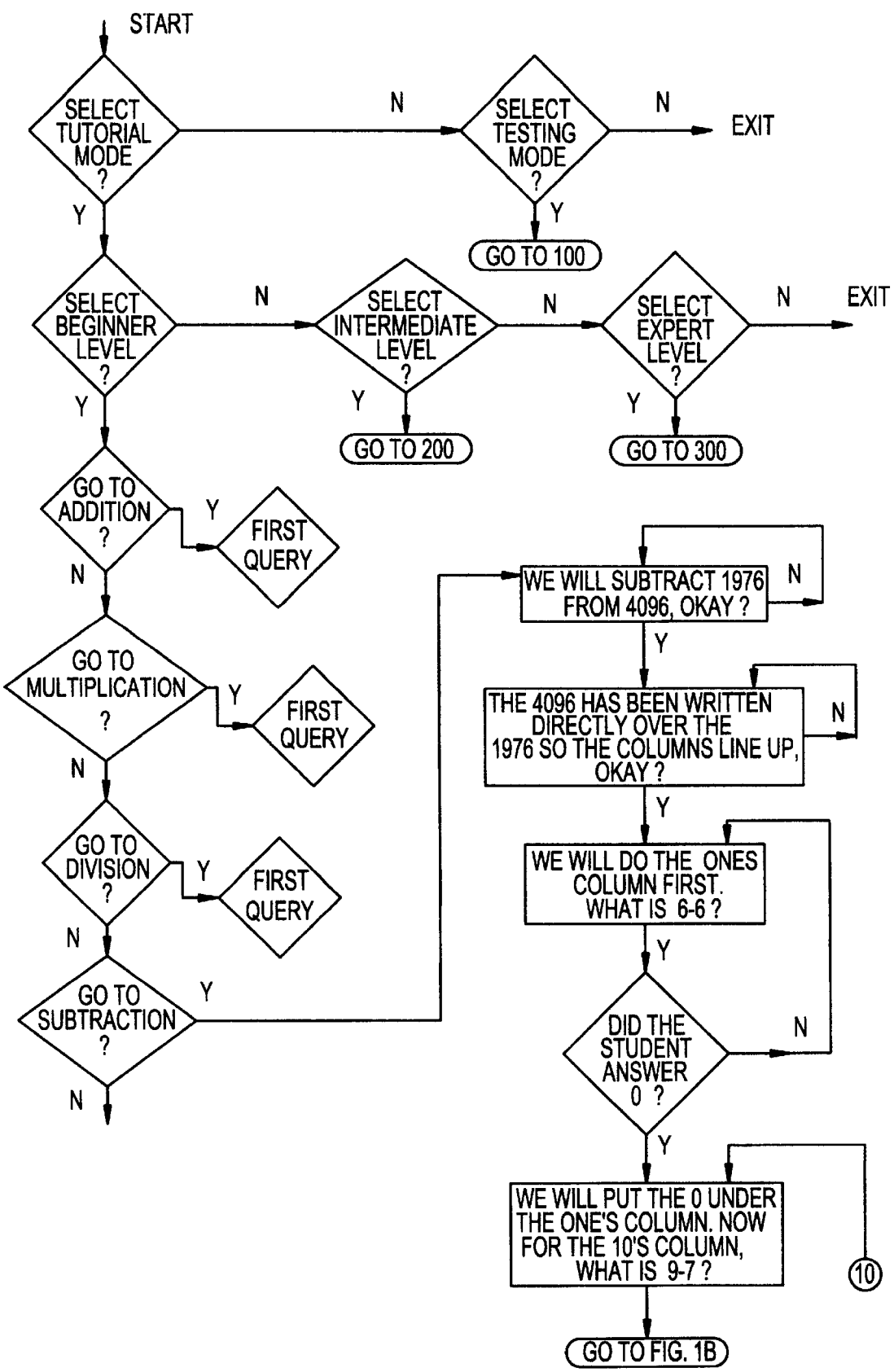
FIG. 1A–C is a flowchart detailing the flow of steps involved in the method of the present invention.
Figure 1B:
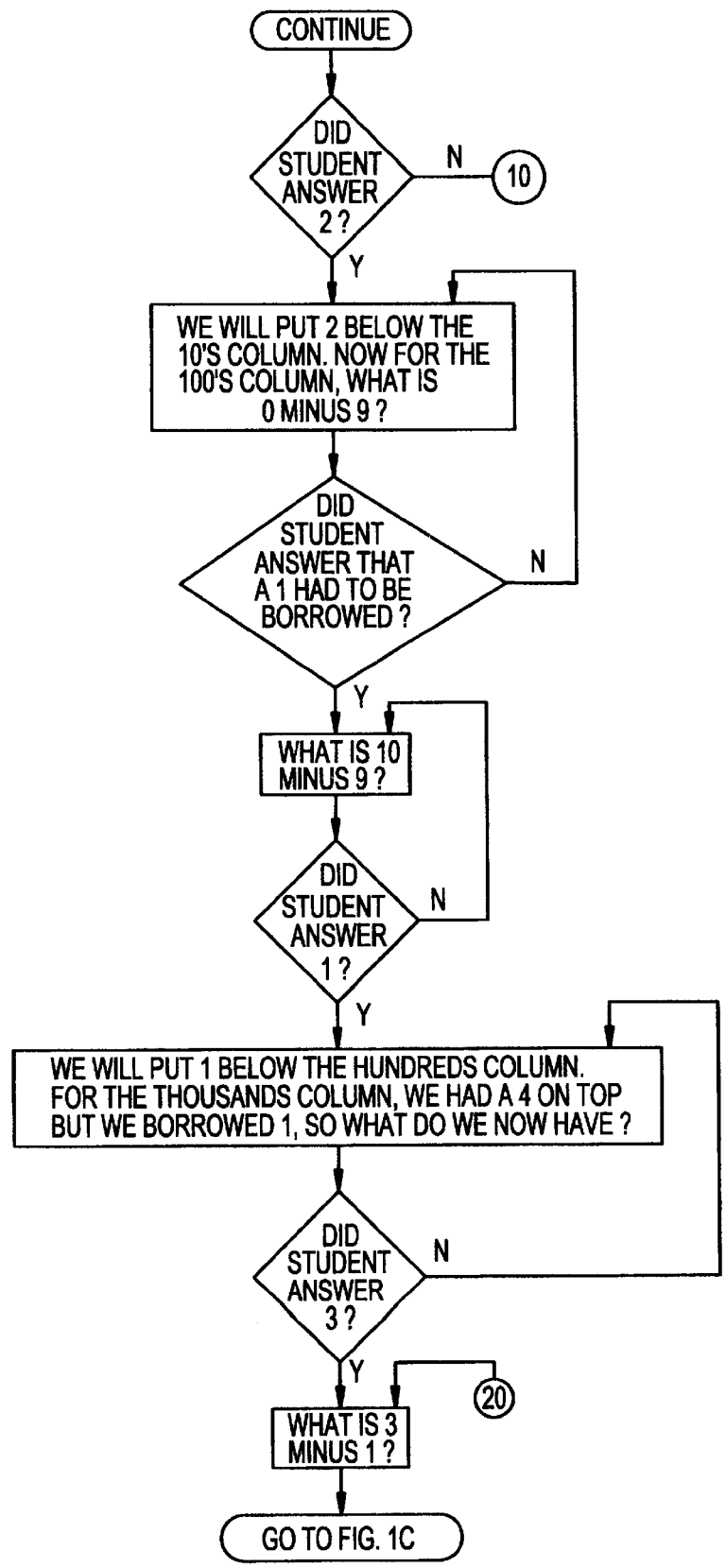
Figure 1C:
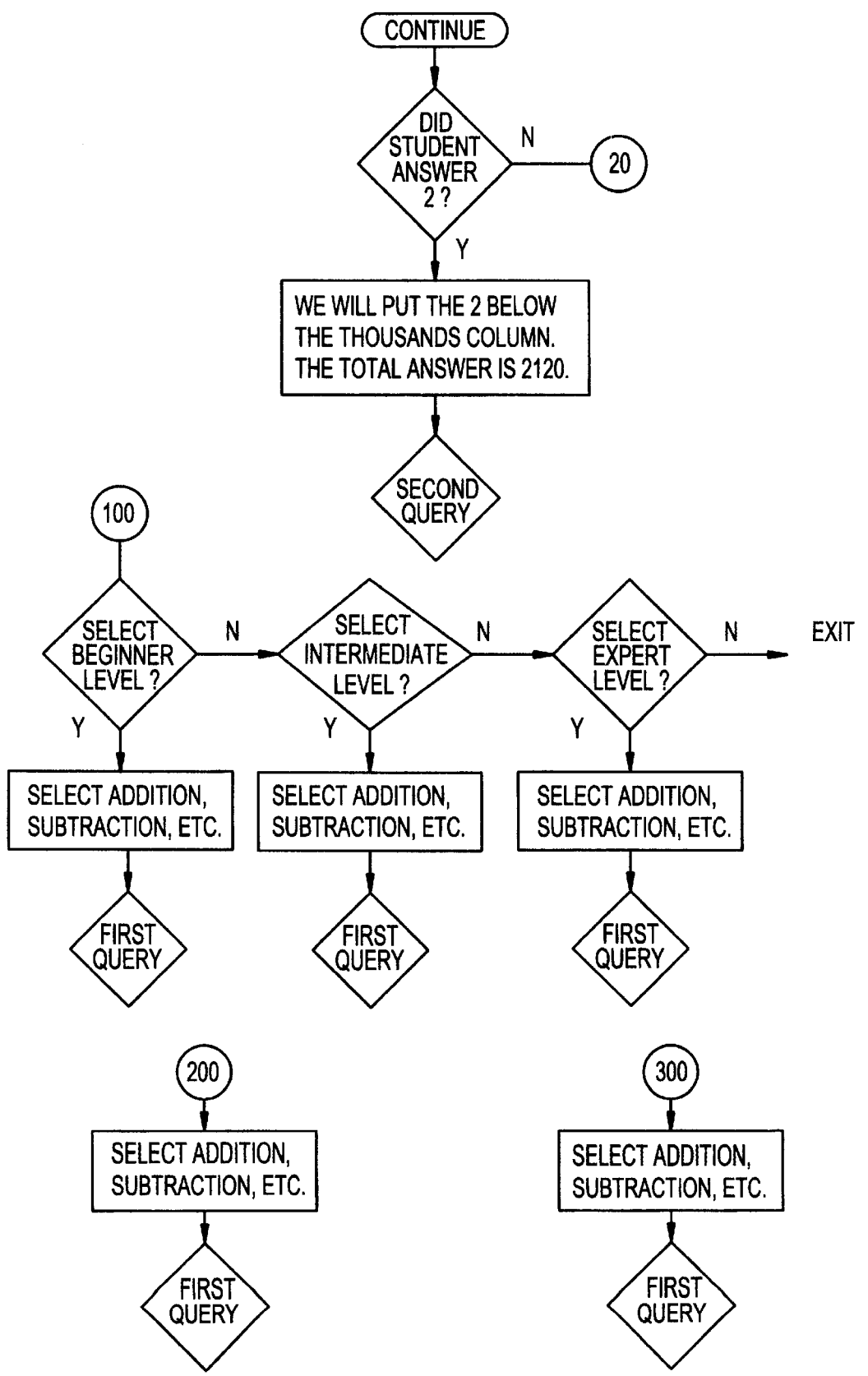

The present invention overcomes the deficiencies in the prior art. The method of the present invention teaches mathematics to a student with a disability, such as blindness, by using an interactive process to output a plurality of queries to the student, one at a time. The interactive process of the present invention will retrieve from memory a selected problem module containing a series of problems, like a typical homework assignment or classroom test.

The invention forces the user to learn the correct steps in solving a mathematical problem, it creates a permanent record of the steps and results that can be reviewed and/or corrected at a later time. It presents data in a standard form that is easily recognized by teachers and other students. It reinforces a skill that can be used throughout the life and career of the individual. It is easy to manipulate, "user friendly", and can accept and present information in a variety of ways to suit a variety of individuals: voice output or large print or braille for those who cannot see, voice output and highlighted text for people that are learning-disabled, and voice input (from commercial products) for those that cannot use a keyboard or mouse.

Initially, the student-user selects one of two different modes of instruction for the interactive program. A first instructional mode is the tutorial mode. In the tutorial mode, the simulated instructor will give the student-user more explicit hints/advice for solving the mathematical problems presented. And, in this mode, the student can consult a built-in calculator function to give him the correct answer to the problem presented if he asks for it or to tell him that he has correctly answered a problem.

The second instructional mode is the testing mode. In the testing mode, the hints, help and calculator function are eliminated. In this mode of operation, the student tests himself to determine if he has comprehended a concept which he was attempting to learn in the tutorial mode.

The next step in the process of the present invention is for the student-user to select one of three different skill levels for instruction/teaching depending on the student's expertise in a given mathematical skill. A first skill level is the beginner level. If this skill level is selected, the problems will be the easiest ones to solve, the simulated instructor will provide the student with the longest possible period of time in which to answer the questions. A second skill level is the intermediate level. If this skill level is selected, the problems presented to the student will be slightly more difficult than those in the beginner level and the simulated instructor will allow slightly less amount of time within which the student must provide an answer to a given problem.

A third level of instruction is the expert level. The expert level of instruction will present the problems in a more cryptic form and will set time limits for each problem to encourage the student to work quickly.

The next step in the interactive process of the present invention is for the student-user to select one of a plurality of problem area modules for instruction. Each module comprises a plurality of mathematical problems for solution. Each module presents problems for instruction in a different category of basic mathematical skills, such as addition, subtraction, multiplication, and division. As a student's skills advance, problem modules include calculus, geometry, etc.

In order for the student to make these selections and to answer the problems which will be presented, the present invention is designed to accept input from several devices, to suit a variety of individuals, i.e., different input devices being envisioned for use by students with different types of disabilities. The standard computer keyboard is one of these devices. Also, the mouse, or other point and click devices, will be supported. Voice recognition input systems will be used for people that are not able to use their hands.

The keyboard will be configured to control the pace and direction of the dialog. The user may want to review the steps and answers given so far, or look ahead to see what problems lie there. The particular keys for these tasks will be definable by the user, but the default can be defined by such items as arrow keys and other cursor-movement keys, the "<" or ">" keys, and mnemonics like Cntrl+N for "Next step" and Cntrl+P for "Previous step."

Other keys will be used to interrogate the simulated instructor, such as the Cntrl+Q keys for "ask me the current question" or "?" for "what column are we in now?" These keys will also be definable by the user. Communication by the student will be accomplished through a set of key words, either spoken verbally or entered by keyboard. They can be abbreviated and represented by one or two letters. The Key Words can be stored in an alphabetized list which can be retrieved by the student at any time. For example, one key word is "Below" which is abbreviated by the letter "B." As the user types a "B," the word "Below" will appear on the screen and/or be spoken by the voice of the voice simulator. The method of the present invention will use the proper terms for the mathematical function being performed.

Once the student-user makes all of his selections, the simulated instructor outputs an initial query to the student for response, the initial query representing a subpart of a first mathematical problem in the selected problem module.

The present invention will be able to present data as output to the student-user in several ways. Voice synthesizers, like those used by "screen readers" by blind people, will be used for people that are blind, vision-impaired, or learning-disabled. Enlarged and highlighted text or graphical symbols on the computer monitor will be used for people that are vision-impaired or learning disabled. Tactile devices like refreshable Braille displays will be used for people that prefer this method or for someone that is both deaf and blind.

These output modes are in common use today in the disabled computer-user community. The method of the present invention will be able to support or function with these products.

The student will respond to the initial query by the simulated instructor by inputting an answer to the subpart of the first mathematical problem. The simulated instructor will then indicate to the user whether the user's input answer was correct or incorrect. The simulated instructor will output a second query representing a second subpart of the first mathematical problem in the selected module if the user's input answer was correct or will reiterate the first subpart of the first mathematical problem if the input answer was incorrect. The user will then respond to the simulated instructor's second query, to which the simulated instructor will indicate if the user's answer was correct or incorrect.

The responding, indicating and outputting steps will be repeated until the student solves the first mathematical problem in the selected problem area module. The simulated instructor will then output a second-level query to the user representing a second mathematical problem for solution, and the iterative process will then repeat itself until all problems in the selected module are solved.

For example, the process for teaching subtraction in the Test Mode can be illustrated as follows. In the "Test" mode, the student will have to determine where to put the results of each intermediate step, and what step to perform next and will tell the "simulated instructor."
Instructor: "We want the answer to 4096 minus 1976."
User: "Align Larger Over Smaller."
Instructor: "Okay, 4096 is written over 1976, they are aligned."
User: "Column 1, Top-Bottom."
Instructor: "6 minus 6."
User: "=0 Below Column 1."
Instructor: "Okay, I put the 0 below column 1."
User: "Column 2 Top-Bottom"
Instructor: "9 minus 7."
User: "=2 Below Column 2."
Instructor: "Okay, I put the 2 below column 2."
User: "Column 3 Top-Bottom"
Instructor: "0 minus 9."
User: "=1 Below Column 3, borrow 1."
Instructor: "Okay, I put the 1 below column 3, borrowed 1."
User: "=2 Below Column 4."
Instructor: "Okay, I put the 2 below column 4."
User: "Column 5, Top-Bottom"
Instructor: "No more data."
User: "Read Answer."
Instructor: "2120."
User: Accept answer.

The answer will be placed into the file that the problems came from, or a copy of it, so it can be printed later.

In the above example, it is assumed that the student-user was not using a computer keyboard and was required to verbally tell the simulated instructor where to put the answer for each subpart. The voice recognition software will interpret the spoken words and generate the appropriate commands to the interactive program of the present invention. In the alternative, users who are not blind and/or blind users who are familiar with spatial concepts and a "screen reader" can move a mouse/cursor as an input device to the proper "columns" location, such as below the column to be subtracted. Then, the user can press a designated "give me the data here" key which will cause the simulated instructor to respond with the digits to be handled in that column.

When the user is working with a selected problem module, only the answer itself to a given subpart is important, not the placement of where the answer is written.

The user may "unlock" himself from the restrictions of the interactive process at any time and may "look at" the problem in free-form using the cursor keys or mouse or voice input command such as "Review mode, Column 1, read result" to select a segment of the problem to be reviewed. For example, when the process is "working on" column 3 in the above subtraction example, the user will be able to move the cursor to column 1 and read the answer placed there.

If the user had selected the tutorial mode instead of the testing mode with respect to the subtraction module illustrated above, in this mode, the simulated instructor will tell the student-user what step is being taken to solve the problem, what should be done with the data, and will prompt the user for an answer. If an answer is given by the user, the simulated instructor will tell the user what is being done with the answer to that subpart, i.e., "placing answer below column 2." If the user asks for help, the simulated instructor will describe the current column being worked on (i.e., ones, tens), will tell the user the top and bottom digits, will point out to the user if a borrow must occur, and will prompt the user for an answer. Once an answer is given, the simulated instructor will then move to the next step in the process continuing to coach the user. If the student-user is still confused, the "previous" key or voice command may be used to go back to the previous step and review the step with the answers. An illustration of the same subtraction problem illustrated above is provided with respect to the tutorial mode.

Instructor: "We want the answer to 4096 minus 1976. I will align the two numbers, 4096 over 1976, so that their columns of digits line up. Then we can easily subtract each column. What is the answer for column 1, 6 minus 6?
User: "=0 Below Column 1."
Instructor: "Very good, I put the 0 below column 1. Now, we must subtract the numbers in column 2. What is 9 minus 7."

User: "=2 Below Column 2."
Instructor: Very good, I put the 2 below column 2. Now we must subtract the numbers in column 3. What is 0 minus 9."
User: "Help."
Instructor: Okay, the answer is 1, but you must first borrow 10 from the previous column, making the problem 10 minus 9.
User: "Okay."
Instructor: "Now we will subtract the numbers in column 4, what is 4 minus 1, having borrowed 1?"
User: "=2 Below Column 4."
Instructor: "Very good, I put the 2 below column 4. There is no more data. The final answer is the numbers below each column, which is 2120."

More complex problem modules are provided such as in the area of geometry. Here is an example of how the process of the present invention would handle the question "What is the length of the hypotenuse of a right triangle whose legs are 3 inches and 5 inches" in the testing mode.

The process of the present invention would read in the user's selection of the geometry module and would present the first problem from a file. A key word would alert it to the type of problem at hand, e.g. "right triangle" or "Pythagorean Theorem". A particular module or subroutine would then be invoked to handle the specific type of problem. Other important information would be "leg A=5 inches, leg B=3 inches". The specific answer desired could be explicit, e.g. "What is the length of the hypotenuse?" or simply "Hypotenuse=?". In this example the question is implicit because 2 of the 3 legs are given. Once the problem is read and deciphered by the process the dialog begins:
Instructor: "Problem, right triangle. Find length of hypotenuse. Side A=5 inches. Side B=3 inches." (the data is presented in phrases or chunks, so it can be read and digested a piece at a time. Output techniques like voice, Braille, or enlarged text perform best with small pieces.)
User: "Present as A squared+B squared=C squared."
Instructor: "Okay, A squared+B squared=C squared."
User: "A squared=25."
Instructor: "25+B squared=C squared."
User: "B squared=9."
Instructor: "25+9=C squared."
User: "25+9=34."
Instructor: "34=C squared."
User: "C=square root of 34."
Instructor: "C=square root of 34."
User: "Accept answer."

Below is the same problem done in Tutor Mode: Instructor: "Problem, right triangle. Find length of hypotenuse. Side A=5 inches. Side B=3 inches. We will use the Pythagorean Theorem, A squared+B squared=C squared, A and B are the shorter sides, the right-angle sides. C is the length of the long side, the hypotenuse."
"A=5, what is A squared?"
User: "A squared=25."
Instructor: "Very good. B=3, what is B squared?"
User: "B squared=9. "
Instructor: "Very good. A squared=25, B squaed=9, what is A squared+B squared?"
User: "25+9=34"
Instructor: "Very good. 34=C squared, what does C equal?"
User: "Help"
Instructor: "C=square root of 34."
User: "Accept answer."

The "Very good" after each correct answer may be useful initially, however, many users may become annoyed by it. This feature will be configurable by the user, a setting known as Verbosity will control the amount of verbiage in these dialogs. More expert users will probably want less verbiage. The student will also be able to make adjustments to the simulated voice to make it easier to understand with adjustments in the volume, rate and pitch, etc. Moreover, to encourage beginners and to relieve frustration, rewards may be built into the process for good performance by the student and sympathy for "not-so-good" performance. The simulated voice of the instructor can produce sound effects, such as a standing ovation, congratulations from a celebrity, or a cartoon character ("yabba dabba doo!").

It will be apparent to those skilled in the art that various modifications and variations can be made in the method of the present invention without departing from the scope or spirit of the invention. Thus, it is intended that the present invention cover the modifications and variations of this invention provided they come within the scope of the appended claims and their equivalents.

What is claimed is:

1. A method of teaching mathematics to a student with a disability, said method utilizing a computer including processing means, memory means, input means, output means and a program stored in said memory means, said program including a plurality of problem area modules for instruction, said method comprising the steps of:

using an interactive process to output a plurality of queries to the student, said plurality of queries being output one at a time;

selecting a predetermined one of two different modes of teaching of said interactive process, a first predetermined mode of teaching being a tutorial mode for initial learning of a concept by the student, said tutorial mode including a step of describing spatial layout of the numbers in rows and columns so as to teach the student to solve a mathematical problem by moving from right to left in the columns of numbers in order that the problem may be solved in a manner similar to that typically taught to non-disabled students, a second predetermined mode of teaching being a testing mode for testing whether the student comprehended the concept in the first mode;

selecting a predetermined one of three skill levels of said plurality of queries, a first skill level being a beginner level, a second skill level being an intermediate level and a third skill level being an expert level;

selecting a predetermined one of a plurality of problem area modules for instruction, said problem area modules comprising a plurality of problems for solution in the basic mathematical skills including addition, subtraction, multiplication, division, calculus and geometry;

outputting an initial query to the student for response, said initial query being a subpart of a first mathematical problem in said predetermined, selected one of said plurality of problem area modules, wherein said outputting step includes the use of said output means, wherein said output means includes a speech synthesizer for a student who is blind or vision-impaired and a refreshable Braille display for a student who is blind and deaf;

responding to said initial query by inputting an answer via said input means to said subpart of said first mathematical problem;

indicating whether said input answer was correct or incorrect, without the use of an arithmetic logic unit or calculator;

outputting a second query via said output means, wherein said second query represents, a second subpart of said first mathematical problem if said input answer was correct or a reiteration of said first subpart of said first mathematical problem to the student for response if said input answer was incorrect;

repeating said responding, indicating and outputting steps until the student correctly solves the first mathematical problem;

outputting a second-level query via said output means to the student for response, said second-level query being a subpart of a second mathematical problem in said predetermined, selected one of said plurality of problem areas; and repeating said outputting, responding, indicating and repeating steps until all of said plurality of problems for solution in said selected problem area module have been solved.

2. The method of teaching mathematics to a student with a disability as claimed in claim 1 wherein said responding by inputting an answer step comprises the use of a standard computer keyboard.

3. The method of teaching mathematics to a student with a disability as claimed in claim 1 wherein said responding by inputting an answer step comprises the use of a mouse.

4. The method of teaching mathematics to a student with a disability as claimed in claim 1 wherein said responding by inputting an answer step comprises the use of voice recognition software wherein the user speaks the answer.

5. The method of teaching mathematics to a student with a disability as claimed in claim 1 wherein said expert skill level comprises queries of the highest level of difficulty and the student is given a time limit for responding to said queries.

6. The method of teaching mathematics to a student with a disability as claimed in claim 1 wherein any of said outputting an initial query step, said responding to said initial query step, said indicating whether said input answer was correct or incorrect step, said outputting a second query step or said step of repeating said responding, indicating and outputting steps can be interrupted by a step of reviewing said steps and said prior input answers.

7. The method of teaching mathematics to a student with a disability as claimed in claim 1 wherein any of said outputting an initial query step, said responding to said initial query step, said indicating whether said input answer was correct or incorrect step, said outputting a second query step or said step of repeating said responding, indicating and outputting steps can be interrupted by a step of advance viewing the next steps.

8. The method of teaching mathematics to a student with a disability as claimed in claim 1 wherein said responding to said initial query step by inputting an answer further includes a step of indicating in said answer the spatial position of said answer by indicating in which column a digit should be placed and whether the answer requires a carry-over to another column or a borrow from another column.

* * * * *